US008676719B2

(12) United States Patent
Cha et al.

(10) Patent No.: US 8,676,719 B2
(45) Date of Patent: Mar. 18, 2014

(54) SYSTEM FOR COLLECTING AND DISSEMINATING INFORMATION ON LOADED/EMPTY VEHICLES

(75) Inventors: Gyu Tak Cha, Seoul (KR); Myoung Suk Yoon, Seoul (KR); Hwui Jin Park, Seoul (KR)

(73) Assignees: SK Innovation Co., Ltd. (KR); SK Energy Co. Ltd. (KR)

( * ) Notice: Subject to any disclaimer, the term of this patent is extended or adjusted under 35 U.S.C. 154(b) by 36 days.

(21) Appl. No.: 13/262,552

(22) PCT Filed: Apr. 2, 2010

(86) PCT No.: PCT/KR2010/002052
§ 371 (c)(1),
(2), (4) Date: Sep. 30, 2011

(87) PCT Pub. No.: WO2010/114342
PCT Pub. Date: Oct. 7, 2010

(65) Prior Publication Data
US 2012/0036082 A1    Feb. 9, 2012

(30) Foreign Application Priority Data

Apr. 3, 2009    (KR) ......................... 10-2009-0029069

(51) Int. Cl.
*G06Q 30/00*    (2012.01)

(52) U.S. Cl.
USPC ......................................................... 705/334

(58) Field of Classification Search
USPC ........................................................... 705/334
See application file for complete search history.

(56) References Cited

U.S. PATENT DOCUMENTS

| 2002/0087371 | A1* | 7/2002 | Abendroth | 705/7 |
| 2004/0218518 | A1* | 11/2004 | Liu et al. | 369/292 |
| 2005/0278063 | A1* | 12/2005 | Hersh et al. | 700/216 |

FOREIGN PATENT DOCUMENTS

| KR | 1020020023900 A | 3/2002 |
| KR | 1020020041884 A | 6/2002 |
| KR | 1020040001757 A | 1/2004 |
| KR | 1020050087755 A | 8/2005 |

* cited by examiner

*Primary Examiner* — John Hayes
*Assistant Examiner* — Allen J Jung
(74) *Attorney, Agent, or Firm* — DLA Piper LLP (US)

(57) ABSTRACT

The present disclosure relates to a system for collecting and providing information on loaded/empty status of vehicles, which gathers loaded and empty vehicle information via the Internet and then provides shipping arrangement agencies in various regions information on freight for which a vehicle has not been dispatched and information on empty vehicles, from information collected on loaded and empty vehicles. Accordingly, multilevel procurement for freight is avoided, and freight can be delivered to a destination in a timely manner as requested by a merchant, which reduces freight transport charges and procurement fees.

5 Claims, 5 Drawing Sheets

SYSTEM FOR COLLECTING AND DISSEMINATING INFORMATION ON LOADED/EMPTY VEHICLES

RELATED APPLICATIONS

This is a §371 of International Application No. PCT/KR2010/002052, with an international filing date of Apr. 2, 2010 (WO 2010/114342, published Oct. 7, 2010), which is based on Korean Patent Application No. 10-2009-0029069 filed Apr. 3, 2009, the subject matter of which is incorporated herein by reference.

TECHNICAL FIELD

The present disclosure relates generally to a system for collecting and providing freight and empty vehicle information and, more particularly, to a system for collecting and providing freight and empty vehicle information, which collects freight information and empty vehicle information over the Internet and enables agent affiliates in all freight areas to share the freight and empty vehicle information that is part of the freight and empty vehicle information that was collected and is related to freight and one or more vehicles that are not allocated yet, so that a plurality of agents can be prevented from intervening in the transport of freight and so that freight can be transported to desired locations at desired times, thereby reducing freight charges and agent charges.

BACKGROUND

In general, the transport of freight is performed in such a way that the owner of the freight directly entrusts the transport of the freight to a freight transport company or an independent transport service provider and pays transport charges, or in such a way that the owner of the freight commits the freight to a transport agent, the transport agent entrusts the transport of the freight to a transport service provider, and, if a contract is made, the transport agent receives agent fees from the transport service provider and the transport service provider receives transport charges from the owner of the freight.

However, currently, freight transport companies do not have transport vehicles enough to satisfy the requests of the owners of freight, and transport agents also do not provide freight transport services enough to satisfy the requests of the owners of freight due to lack of information about the owners of transport vehicles.

Accordingly, when a freight transport service requires a long time and a high cost, a problem arises in that excessive transport charges are requested or in some cases, the transport of freight is rejected.

Furthermore, since a transport agent to whom the transport of freight was entrusted, in turn, entrusts the transport of freight to anther transport agent, a plurality of transport agents intervenes in the transport of freight. Furthermore, the burden of additional agent fees is passed on to the owner of freight or the owner of a vehicle. Accordingly, the burden of logistic expenses of the owner of freight increases while the income of an independent transport service provider who transports freight decreases, so that a problem arises in that the profitability of the owner of freight and the profitability of the independent transport service provider are degraded.

Accordingly, since the independent transport service provider must ask a plurality of transport agents to entrust the transport of freight to him or her or move a long distance in an empty state in order to improve his or her profitability, he or she spends more time in obtaining freight information and moving around than in actually transporting freight, so that a problem arises in that independent transport service providers who have dangerous occupations requiring sufficient rests are always exposed to dangers because they cannot have sufficient sleep and rest.

In particular, most of the accidents that occur during the running of freight transport vehicles result from sleep or fatigue rather than poor driving skills. Meanwhile, most of freight transport vehicle accidents lead to disaster, which causes irreparable losses to the society and nation as well as the owners of vehicles and their families.

Meanwhile, according to recent statistics (complied by the Korea Transport Institute, and issued on Sep. 22, 2000), it is reported that the Korean domestic empty vehicle ratio is higher than those in advanced countries by about 10%. Accordingly, it is expected that when the empty vehicle ratio is decreased by 10%, a transport cost of about three trillion won can be saved.

However, in the Korean domestic transport market, although the empty vehicle ratio is high as described above, there are frequent cases where freight cannot be transported at a scheduled time because the owner of the freight cannot ensure an empty vehicle.

Accordingly, in order to transport freight at a scheduled time and reduce the empty vehicle ratio, there is a general trend toward a technology for sharing freight information (provided by the owners of freight) and empty vehicle information (provided by transport agents, transport service providers, and independent transport service providers) on-line, thereby handling the transport of freight at low cost and with high efficiency.

SUMMARY

The present disclosure provides a system for collecting and providing freight and empty vehicle information, which collects freight information and empty vehicle information over the Internet and enables agent affiliates in all freight areas to share the freight and empty vehicle information that is part of the freight and empty vehicle information that was collected and is related to freight and one or more vehicles that are not allocated yet, so that a plurality of agents can be prevented from intervening in the transport of freight and so that freight can be transported to desired locations at desired times, thereby reducing freight charges and agent charges.

The present disclosure provides a system for collecting and providing freight and empty vehicle information, including at least one freight owner terminal for sending freight information, including a type, quantity and size of freight, a desired date and time of departure, a place of departure, a place of arrival, contact information of an owner of the freight, and freight charges, to an outside, and receiving vehicle allocation information from the outside; at least one transport affiliate terminal for sending transport affiliate information, including a location, name and contact information of a transport affiliate, vehicle information, information about a driver of a vehicle, and empty vehicle information to the outside; at least one agent affiliate terminal for sending agent affiliate information, including a location, name and contact information of an agent affiliate, and empty vehicle information related to its vehicle to the outside, and allocating its empty vehicle to transport of the freight, entrusted by the owner of the freight, using the freight and empty vehicle information sent from the outside; and a freight and empty vehicle information management server for classifying and storing the freight information, the empty vehicle information, the transport affiliate information and the agent affiliate information, sent by the freight owner terminal, the transport affiliate terminal and the agent affiliate terminal, according to freight area and agent affiliate, and providing the freight and empty vehicle information so that agent affiliates and transport affiliates in all freight areas and the owner of freight can share them, in such a way that only empty vehicle information of the corresponding transport affiliate in an identical freight area is provided to the corresponding agent affiliate terminal, standby vehicle information is provided to another agent affiliate terminal in the identical freight area, and freight and empty vehicle information unrelated to the agent affiliate is provided to the agent affiliate terminals in all the freight areas.

The freight owner terminal may send the freight information to any one of the agent affiliate terminal and the freight and empty vehicle information management server, and the agent affiliate terminal may send the freight information, received from the freight owner terminal, to the freight and empty vehicle information management server.

The freight and empty vehicle information management server, when providing empty vehicle information to the agent affiliate terminal, may provide the number of each empty vehicle and information about an agent affiliate or a transport affiliate in charge of the empty vehicle to agent affiliate terminals in an identical freight area, and provide the number of the empty vehicle and information about a driver of the empty vehicle to agent affiliate terminals in different freight areas.

The freight and empty vehicle information management server, when the empty vehicle registered in the freight and empty vehicle information management server does not belong to a specific agent affiliate, may provide the number of the empty vehicle and the information about the driver of the empty vehicle to all agent affiliate terminal.

The freight and empty vehicle information management server may provide a backhauling setting window to the agent affiliate terminal so as to allow backhauling to be set so that vehicle D allocated to transport of freight C from area A or freight area A to area B or freight area B can transport freight E from area B or freight area B to area A or freight area A after completing the transport of freight C.

The system may further include an empty vehicle registration gas station device for sending information about the emptiness of the corresponding vehicle to the agent affiliate terminal or the freight and empty vehicle information management server when a card reader installed in a gas station is made to read the membership card of an independent transport service provider who requests registration of empty vehicle information.

Agent affiliates can share the overall freight and empty vehicle information over the Internet, so that even when an agent affiliate to which the transport of freight was entrusted by the owner of the freight does not have a vehicle suitable for the request of the owner of freight, the freight can be transported by some other agent affiliate in the same freight area or an independent transport service provider, thereby enabling the freight to be transported to the location desired by the owner of freight at the time desired by the owner of the freight.

The overall freight information is provided to all the agent affiliates, the owner of freight and all the transport affiliates over the Internet, so that the transport of freight can be prevented from being repeatedly entrusted between agent affiliates, thereby preventing a plurality of agents from intervening in the transport of freight and blocking an increase in freight charges, charged by the owner of freight, and a reduction in freight charges, charged by an independent transport service provider, which are caused by the intervention of the plurality of agents.

Furthermore, each of a plurality of agent affiliates generates information about the destination of each vehicle using information about the places of loading and unloading of the vehicle and each vehicle which was not allocated to the transport of freight is registered in the freight and empty vehicle information management server as a standby vehicle, so that it is easy to mange empty vehicles.

Moreover, the freight and empty vehicle information management server provides freight and empty vehicle information related to a corresponding agent affiliate only to the corresponding agent affiliate and provides the freight and empty vehicle information to the agent affiliates in all the freight areas when the corresponding agent affiliate requests that the freight and empty vehicle information be shared, so that profits can be ensured for each of the plurality of agent affiliates and so that information about freight which cannot be handled by a corresponding agent affiliate and/or information about a vehicle of the corresponding agent affiliate which was registered as an empty vehicle is provided to other agent affiliates as freight and empty vehicle information, thereby enabling freight to be transported to the place desired by the owner of the freight at the time desired by the owner of the freight.

BRIEF DESCRIPTION OF THE DRAWINGS

FIG. 5 is a diagram illustrating freight information provided by the freight and empty vehicle information management server shown in FIG. 1.

DESCRIPTION OF REFERENCE NUMERALS OF PRINCIPAL ELEMENTS IN THE DRAWINGS

2: freight/empty vehicle information management server
4: agent affiliate
6: transport affiliate 8: owner of freight
10: empty vehicle registration gas station device

DETAILED DESCRIPTION

Preferred embodiments of the present disclosure will be described in detail below with reference to the accompanying drawings.

Figure 1:
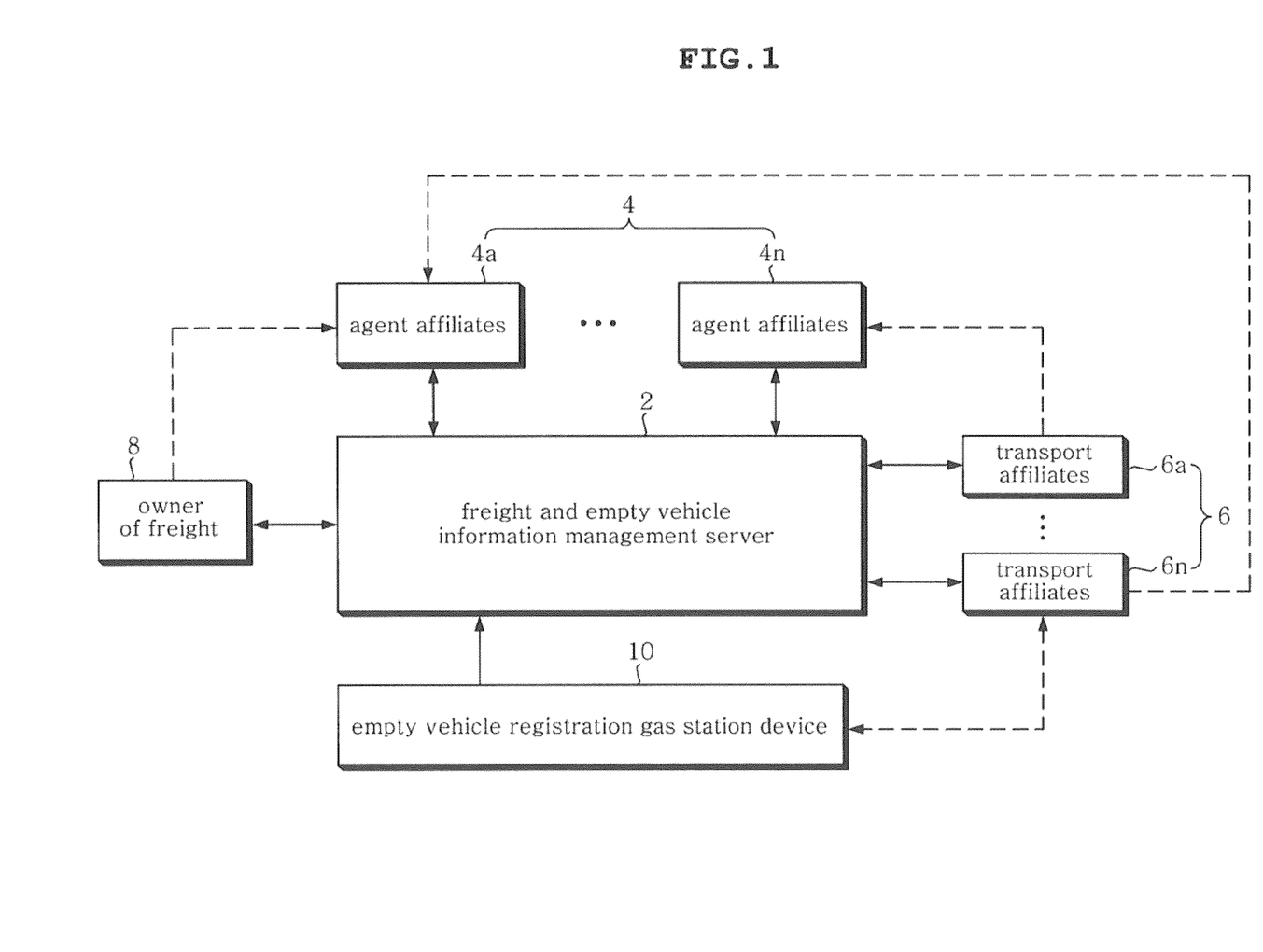
FIG. 1 is a diagram illustrating a system for collecting and providing freight and empty vehicle information according to an embodiment of the present disclosure.

FIG. 1 is a diagram illustrating a system for collecting and providing freight and empty vehicle information according to an embodiment of the present disclosure.

Referring to FIG. 1, the system for collecting and providing freight and empty vehicle information according to the embodiment of the present disclosure includes the owner 8 of freight, a plurality of agent affiliates 4a-4n, a plurality of transport affiliates 6a-6n, an empty vehicle registration gas station device 10, and a freight and empty vehicle information management server 2.

The owner 8 of freight sends freight information, including information about the type, quantity and size of freight, the desired date and time of departure, a place of departure, a place of arrival (that is, a destination), the contact information of the owner of the freight, and freight charges, to the freight and empty vehicle information management server 2, and receives vehicle allocation information from the freight and empty vehicle information management server 2, using a freight owner terminal capable of wired or wireless communication (for example, a PC or an Internet accessible mobile communication terminal).

The owner 8 of freight is classified as an ID-issued freight owner who was issued with the ID by a specific agent affiliate 4 or a general freight owner. An ID-issued freight owner provides freight information, possessed by him or her, to a corresponding agent affiliate 4 using a freight owner terminal capable of wired or wireless communication, and the agent affiliate 4 registers the freight information, provided by the ID-issued freight owner, in the freight and empty vehicle information management server 2 using an agent affiliate terminal in the area of the agent affiliate.

Meanwhile, the general freight owner provides freight information, possessed by him or her, directly to the freight and empty vehicle information management server 2 or to a specific agent affiliate 4 using a freight owner terminal.

In this case, the freight information provided by the general freight owner to the specific agent affiliate 4 is sent to the freight and empty vehicle information management server 2 by the agent affiliate 4 which is provided with the freight information by the general freight owner.

Each of the plurality of agent affiliates 4a-4n sends freight information that is provided by an ID-issued freight owner who was issued an ID by the corresponding agent affiliate or that is provided by a general freight owner who entrusts freight transport to the corresponding agent affiliate, information about a vehicle that belongs to the agent affiliate, information about the driver of the vehicle, and information about the agent affiliate to the freight and empty vehicle information management server 2 using an agent affiliate terminal capable of wired or wireless communication, which is installed in the area of the agent affiliate.

Here, the vehicle that belongs to the agent affiliate may be a vehicle which is possessed by the agent affiliate, that is, a vehicle under the direct management of the agent affiliate, a transport affiliate vehicle registered to the agent affiliate, or an independent vehicle registered to the agent affiliate.

Meanwhile, the vehicle information may include information about a vehicle number, the type of vehicle (for example, a wing body truck, a cargo truck, a freight container truck, or the like), and tonnage, the driver information may include information about the name and contact information of the driver, and the agent affiliate information may include information about the location, name and contact information of the agent affiliate.

Furthermore, the plurality of agent affiliates 4a-4n receives the freight and empty vehicle information of the corresponding agent affiliate and the freight and empty vehicle information of other freight areas from the freight and empty vehicle information management server 2 via their agent affiliate terminals.

Here, the term "freight area" refers to an area which corresponds to one of the areas that are obtained by dividing the entire country into a plurality of areas while considering at least one of the amount of freight that must be transported by a vehicle, the moving distance of the vehicle, a moving path and moving time on the basis of the place of loading (a place where freight will be loaded, or a garage) of the vehicle.

Freight areas may include, for example, the western part of a capital area, the eastern part of the capital area, Incheon, the northern part of Gyeonggi province, the western part of Gyeonggi province, the southern part of Gyeonggi province, the northern part of Gangwon province, the southern part of Gangwon province, the eastern part of Gangwon province, Chungbuk province, the northern part of Chungbuk province, Daejeon city, Chungnam province, Gyeongbuk province, Gyeongnam province, Pusan city, the western part of Ulsan city, the eastern part of Ulsan city, Daegu city, Gwangju city, Jeonnam Province, Jeonbuk province, etc.

In other words, each of the plurality of agent affiliates 4a-4n receives the freight information of other agent affiliates in the same freight area, and with regard to empty vehicle information, receives information about the agent affiliate of at least one standby vehicle from the freight and empty vehicle information management server 2.

In this case, each of the plurality of agent affiliates 4a-4n receives freight and empty vehicle information unrelated to a specific agent affiliate regardless of the freight areas from the freight and empty vehicle information management server 2 via an agent affiliate terminal.

Furthermore, each of the plurality of agent affiliates 4a-4n, using an agent affiliate terminal, searches the freight and empty vehicle information management server 2 for one or more empty vehicles registered to the corresponding agent affiliate, allocates a vehicle, suitable for the transport of freight entrusted to the corresponding agent affiliate 4, as a freight transport vehicle, and sends vehicle allocation information about the vehicle to the freight and empty vehicle information management server 2.

That is, each of the plurality of agent affiliates 4a-4n, using an agent affiliate terminal, searches for one or more vehicles, whose types or tonnage are suitable for the transport of the freight entrusted by the owner of freight, from information about one or more empty vehicles of the corresponding agent affiliate provided by the freight and empty vehicle information management server 2, and allocates a vehicle, whose place of loading (a place where the freight will be loaded or a garage) belongs to the same freight area as a place where the transport of the freight was entrusted and whose place of unloading (a place where the freight will be unloaded, a destination, or a place of arrival) is the same as the place of unloading of a registered empty vehicle or belongs to the same freight area as a desired place of unloading, as a freight transport vehicle.

In this case, if the freight area of a place where freight was entrusted is the same as the freight area of the place where a registered empty vehicle was loaded but the freight area of the place of arrival of the vehicle is different from the freight area of the place where each registered empty vehicle was unloaded or the freight area where it is desired that the freight be unloaded, each of the a plurality of agent affiliates 4a-4n allocates a vehicle, whose place of unloading or desired place of unloading is reached via the freight area of the place of arrival of the freight or has been registered as a place in the surrounding area of the freight area of the place where the freight has arrived, as a freight transport vehicle.

Meanwhile, if one or more vehicles that belong to a corresponding agent affiliate and that have been registered as empty vehicles are not suitable for the transport of the freight entrusted to the corresponding agent affiliate 4, each of the plurality of agent affiliates 4a-4n searches for all vehicles registered as empty vehicles that are on the freight and empty vehicle information management server 2, and allocates a corresponding vehicle as a freight transport vehicle.

Furthermore, each of the plurality of agent affiliates 4a-4n searches the vehicles to which the transport of freight has been allocated to find a vehicle whose place of loading and place of unloading are the same using the freight information, provided by the freight and empty vehicle information management server 2, via an agent affiliate terminal, and sets "backhauling" so that freight registered in the freight and empty vehicle information management server 2 is allocated to a corresponding vehicle and therefore the freight is transported from the place of unloading of the corresponding vehicle (that is, the vehicle to which the freight was allocated) to the place of loading thereof.

That is, each of the plurality of agent affiliates 4a-4n sets "backhauling" so that vehicle D allocated to the transport of freight C from area A (or freight area A) to area B (or freight area B) can transport freight E from area B (or freight area B) to area A (or freight area A) after completing the transport of freight C.

Each of the plurality of agent affiliates 4a-4n sends vehicle allocation information, including information about the number of a vehicle allocated to the transport of freight upon the allocation of the vehicle and the setting of backhauling, information about the driver of the vehicle, the place of arrival (that is, the place of unloading) of the vehicle, the time when the freight is allocated to the vehicle (that is, allocation time), the departure time when the allocated vehicle will depart, the date and time of unloading when the allocated vehicle will reach the place of unloading (that is, the time at which the place of unloading will be reached), the place where the vehicle will be empty, the desired place of unloading of the vehicle, the contact information of the corresponding agent affiliate, etc., to the freight and empty vehicle information management server 2 using an agent affiliate terminal.

Here, the time at which the place of unloading will be reached is set to the average of the time it takes for vehicles to transport freight from the place of loading to the place of unloading.

As described above, each of the plurality of agent affiliates 4a-4n allocates a vehicle or sets backhauling and then sends vehicle allocation information to the freight and empty vehicle information management server 2, using an agent affiliate terminal, and the freight and empty vehicle information management server 2 classifies and stores one or more allocated vehicles as allocation completion vehicles and then reproduces information about the corresponding vehicles from the empty vehicle information, using the vehicle allocation information sent by the plurality of agent affiliates 4a-4n.

Each of the plurality of transport affiliates 6a-6n sends transport affiliate information, including information about the location, name and contact information of the transport affiliate, vehicle information, information about the driver of the vehicle, and information about the emptiness of the vehicle to corresponding agent affiliates 4a-4n or the freight and empty vehicle information management server 2 using a transport affiliate terminal capable of wired or wireless communication.

Here, the transport affiliate vehicle may be a vehicle possessed by the agent affiliate (for example, a vehicle under the direct management of the agent affiliate), and a vehicle registered to the agent affiliate (for example, a driver owned vehicle or an independent vehicle).

Each of the plurality of transport affiliates 6a-6n, when a vehicle that belongs to the corresponding transport affiliate is allocated by the agent affiliate 4, sends information about whether the corresponding vehicle can perform transport to the agent affiliate 4 or freight and empty vehicle information management server 2 using a transport affiliate terminal.

Accordingly, the agent affiliate 4 allocates a vehicle, which belongs to vehicles registered as empty vehicles and can transport freight, to the transport of the freight entrusted by the owner 8 of freight based on the information about whether the corresponding vehicle can perform transport provided by the transport affiliate 6 via an agent affiliate terminal.

The empty vehicle registration gas station device 10, when an independent transport service provider requesting an empty vehicle information registration has his or her membership card read by a card reader installed in a gas station, sends information about the emptiness of a corresponding vehicle to the agent affiliate 4 or freight and empty vehicle information management server 2.

The freight and empty vehicle information management server 2 classifies and stores freight information (that is, freight information sent via the freight owner terminal or agent affiliate terminal) and agent affiliate information, sent by the owner 8 of freight or agent affiliate 4, according to the freight area and the agent affiliate, and provides the freight information to the owner 8 of freight and the agent affiliate 4 so that the owner 8 of freight and the agent affiliate 4 can share freight information about all freight areas.

Furthermore, the freight and empty vehicle information management server 2 classifies and stores the empty vehicle information, sent by the agent affiliates 4, the transport affiliates 6 and the empty vehicle registration gas station device 10, according to the freight area and the agent affiliate, and provides the empty vehicle information to the agent affiliates 4, the transport affiliates 6 and the owner 8 of freight so that the agent affiliates 4, the transport affiliates 6 and the owner 8 of freight can share empty vehicle information about all freight areas. However, empty vehicle information about the same freight area is provided to only a corresponding agent affiliate 4, and is not provided to the other agent affiliates 4 in the same freight area.

That is, the freight and empty vehicle information management server 2 classifies and stores the freight information, the empty vehicle information, the transport affiliate information and the agent affiliate information, transmitted from the outside, according to the freight area and the agent affiliate, and provides the freight and empty vehicle information so that the agent affiliates 4, the transport affiliates 6 and the owners 8 of freight in all the freight areas can share the freight and empty vehicle information. However, the freight and empty vehicle information management server 2 provides the empty vehicle information of the same freight area only to a corresponding agent affiliate 4, and provides information about the agent affiliate of at least one standby vehicle to the other agent affiliates 4 in the same freight area.

Figure 2:
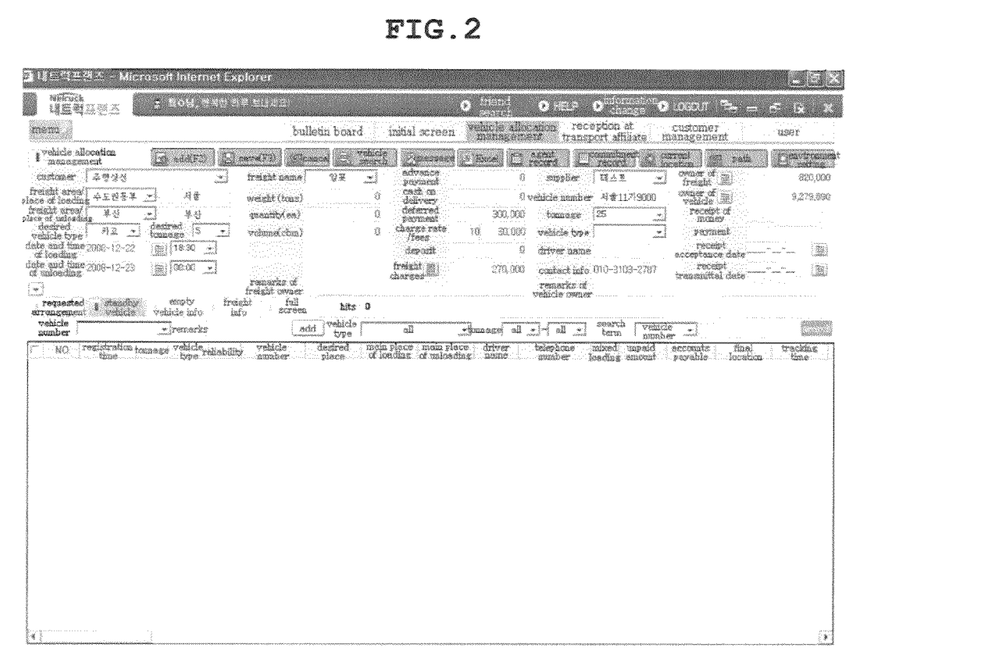
FIGS. 2 and 3 are diagrams illustrating empty vehicle information provided by the freight and empty vehicle information management server shown in FIG. 1.
Figure 3:
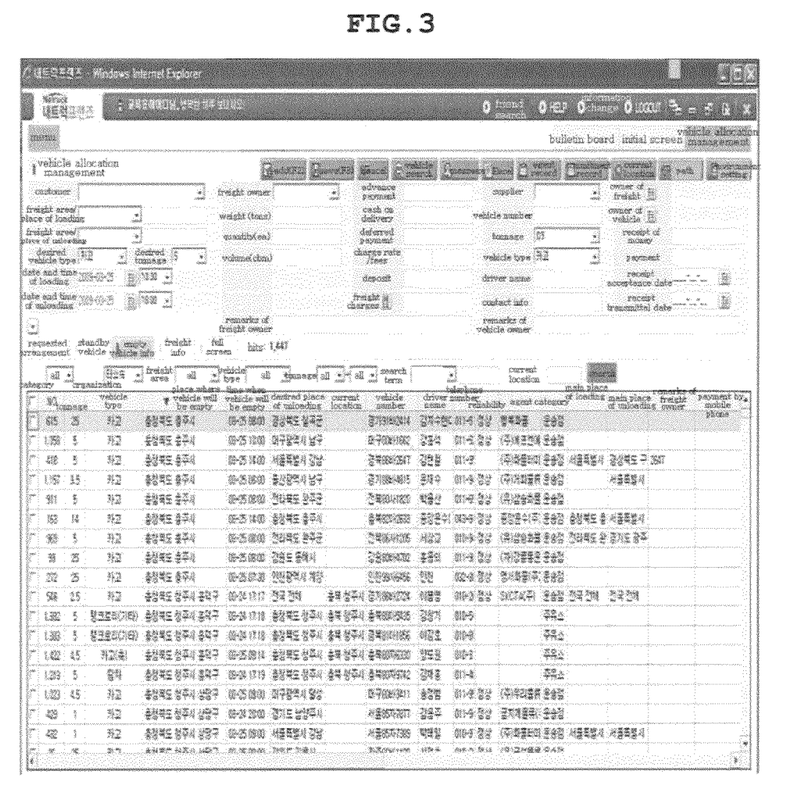
Figure 4:
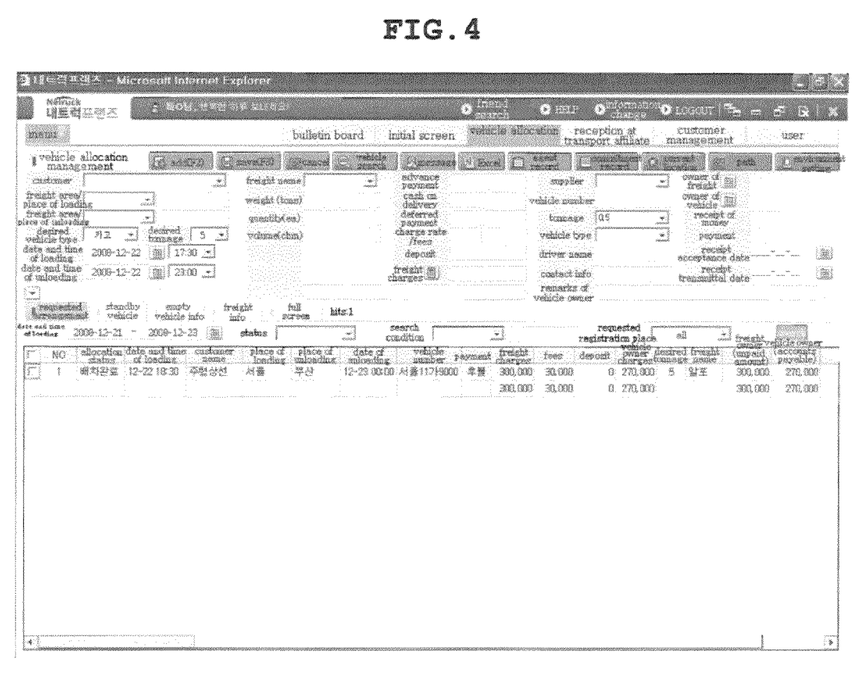
FIG. 4 is a diagram illustrating information about entrusted freight and allocated vehicles provided by the freight and empty vehicle information management server shown in FIG. 1.

In other words, the freight and empty vehicle information management server 2 classifies empty vehicle information of at least one vehicle of the corresponding agent affiliate as information about "standby vehicle," as shown in FIG. 2, classifies a vehicle belonging to some other agent affiliate or a vehicle independent of a specific agent affiliate as "empty vehicle information," as shown in FIG. 3, classifies an allocated vehicle belonging to the corresponding agent affiliate or information about freight entrusted to the corresponding agent affiliate as "entrustment/vehicle allocation," as shown in FIG. 4, and classifies information about freight held by some other agent affiliate and information about freight not belonging to a specific agent affiliate as "freight information," as shown in FIG. 5. This information is provided to the agent affiliates 4, the transport affiliates 6, and the owner 8 of the freight.

When the freight and empty vehicle information management server 2 provides empty vehicle information to the agent affiliate 4, the freight and empty vehicle information management server 2 provides information about an agent affiliate or transport affiliate to which a vehicle registered as an empty vehicle belongs and the number of the vehicle to the agent affiliate 4 in the same freight area, and provides the number of a vehicle registered as an empty vehicle and information about the driver of the corresponding vehicle (that is, an independent transport service provider) to the agent affiliate in a different freight area.

In this case, when the vehicle registered in the freight and empty vehicle information management server 2 as an empty vehicle does not belong to a specific agent affiliate 4, the freight and empty vehicle information management server 2 provides the number of the vehicle and information about the driver of the corresponding vehicle to all the agent affiliates 4.

Accordingly, the agent affiliate 4 in the same freight area, when entrusting the transport of freight to its own vehicle, entrusts the transport of freight to the vehicle by asking another agent affiliate in the same freight area which manages the vehicle as standby vehicle, and the agent affiliate 4 that has moved to a different freight area can directly entrust the transport of freight to the driver of its own vehicle.

The freight and empty vehicle information management server 2 provides freight and empty vehicle information unrelated to the agent affiliate 4 to all the agent affiliates 4a-4n in all the freight areas.

Furthermore, when a specific agent affiliate 4 requests that freight information or empty vehicle information held by the corresponding agent affiliate 4 be shared, the freight and empty vehicle information management server 2 provides the freight information or empty vehicle information held by the corresponding agent affiliate 4 to all the agent affiliates 4a-4n in all the freight areas.

In this case, when the specific agent affiliate 4 requests that freight information or empty vehicle information be shared, the freight and empty vehicle information management server 2 provides only information about freight not allocated to any vehicle and information about each vehicle registered as an empty vehicle to all the agent affiliates 4a-4n in all the freight areas, and reproduces and then provides empty vehicle information related to allocated freight.

The freight and empty vehicle information management server 2 receives empty vehicle information related to the same vehicle from any one of the agent affiliates 4, the transport affiliates 6 and the empty vehicle registration gas station device 10, and classifies it according to the freight area and the agent affiliate.

In other words, when empty vehicle information related to the same vehicle is received from an agent affiliate 4 and a transport affiliate 6, the freight and empty vehicle information management server 2 stores only the empty vehicle information that was last sent.

Furthermore, when vehicle allocation information is sent by the agent affiliate 4 to the freight and empty vehicle information management server 2, the freight and empty vehicle information management server 2 sends a vehicle allocation completion message to a driver (or an independent transport service provider) who drives the allocated vehicle, and sends information about the completion of the allocation of corresponding freight to the owner 8 of the freight who entrusted the transport of the corresponding freight.

Here, the freight and empty vehicle information management server 2 sends information about an allocated vehicle and information about the driver of the vehicle to the owner 8 of freight who entrusted the transport of the corresponding freight when sending the vehicle allocation completion message for the corresponding freight.

Meanwhile, the freight and empty vehicle information management server 2 provides a setting window in which the agent affiliate 4 may set "backhauling" to the agent affiliate 4, as shown in FIG. 6.

Accordingly, as described above, each of the plurality of agent affiliates 4a-4n may set "backhauling" so that vehicle D allocated to the transport of freight C from area A (or freight area A) to area B (or freight area B) can transport freight E from area B (or freight area B) to area A (or freight area A) after completing the transport of freight C.

As a result, the vehicle which has completed the transport of the freight from area A (or freight area A) to area B (or freight area B) can be prevented from moving from area B (or freight area B) to area A (or freight area A) without transporting freight, thereby improving the profitability of an independent transport service provider.

Meanwhile, the freight and empty vehicle information management server 2 provides information about an allocated vehicle or allocated freight only to the owner 8 of freight who entrusted the transport of the corresponding freight, the agent affiliate 4 to which the transport of the corresponding freight was entrusted, the agent affiliate in charge of the vehicle which was allocated to the transport of the corresponding freight, and does not provide the information to the other agent affiliates.

The reason for this is to prevent some other agent affiliate 4 that has received the same freight information from allocating a vehicle of the other agent affiliate 4 to the transport of the same freight.

That is, the freight and empty vehicle information management server 2 provides information about freight allocated to a vehicle only to the owner 8 of freight who entrusted the transport of the corresponding freight, the agent affiliate 4 to which the transport of the corresponding freight has been entrusted, and the agent affiliate (that is, the independent transport service provider) in charge of the vehicle which was allocated to the transport of the corresponding freight, so as to prevent two or more agent affiliates 4 from allocating their vehicles to the transport of the same freight.

Furthermore, the freight and empty vehicle information management server 2 provides information about the freight charges for the freight whose transport was entrusted by the owner 8 of freight to the agent affiliate 4, the transport affiliate 6 and the owner 8 of freight, as shown in FIGS. 4 and 5.

Although the freight and empty vehicle information management server 2 has been described as providing both freight information and empty vehicle information, the freight and empty vehicle information management server 2 may provide only one of either the freight information and the empty vehicle information.

Agent affiliates can share the overall freight and empty vehicle information over the Internet, so that even when an agent affiliate to which the transport of freight was entrusted by the owner of the freight does not have a vehicle suitable for the request of the owner of freight, the freight can be transported by some other agent affiliate in the same freight area or an independent transport service provider, thereby enabling the freight to be transported to the location desired by the owner of freight at the time desired by the owner of the freight.

The overall freight information is provided to all the agent affiliates, the owner of freight and all the transport affiliates over the Internet, so that the transport of freight can be prevented from being repeatedly entrusted between agent affiliates, thereby preventing a plurality of agents from intervening in the transport of freight and blocking an increase in freight charges, charged by the owner of freight, and a reduction in freight charges, charged by an independent transport service provider, which are caused by the intervention of the plurality of agents.

Furthermore, each of a plurality of agent affiliates generates information about the destination of each vehicle using information about the places of loading and unloading of the vehicle and each vehicle which was not allocated to the transport of freight is registered in the freight and empty vehicle information management server as a standby vehicle, so that it is easy to mange empty vehicles.

Moreover, the freight and empty vehicle information management server provides freight and empty vehicle information related to a corresponding agent affiliate only to the corresponding agent affiliate and provides the freight and empty vehicle information to the agent affiliates in all the freight areas when the corresponding agent affiliate requests that the freight and empty vehicle information be shared, so that profits can be ensured for each of the plurality of agent affiliates and so that information about freight which cannot be handled by a corresponding agent affiliate and/or information about a vehicle of the corresponding agent affiliate which was registered as an empty vehicle is provided to other agent affiliates as freight and empty vehicle information, thereby enabling freight to be transported to the place desired by the owner of the freight at the time desired by the owner of the freight.

The foregoing examples are provided merely for the purpose of explanation and are in no way to be construed as limiting. While reference to various embodiments are shown, the words used herein are words of description and illustration, rather than words of limitation. Further, although reference to particular means, materials, and embodiments are shown, there is no limitation to the particulars disclosed herein. Rather, the embodiments extend to all functionally equivalent structures, methods, and uses, such as are within the scope of the appended claims.

The invention claimed is:

1. A system for collecting and providing freight and empty vehicle information, comprising:
    at least one freight owner terminal computer configured to send freight information, including a type, quantity and size of freight, a desired date and time of departure, a place of departure, a place of arrival, contact information of an owner of the freight, and freight charges, and receive vehicle allocation information;
    at least one transport affiliate terminal computer configured to send transport affiliate information, including a location, name and contact information of a transport affiliate, vehicle information, information about a driver of a vehicle, and empty vehicle information;
    at least one agent affiliate terminal computer configured to send agent affiliate information, including a location, name and contact information of an agent affiliate, and empty vehicle information related to an agent affiliate empty vehicle, and allocate the agent affiliate empty vehicle to transport freight, entrusted by the owner of the freight, using freight and empty vehicle information;
    a freight and empty vehicle information management server configured to:
        classify and store the freight information, empty vehicle information, transport affiliate information and agent affiliate information, sent by the freight owner terminal computer, the transport affiliate terminal computer and the agent affiliate terminal computer, according to freight area and agent affiliate, and
        provide freight and empty vehicle information such that only empty vehicle information of at least one transport affiliate in a first freight area is provided to at least one agent affiliate terminal computer in said first freight area, standby vehicle information is provided to at least one other agent affiliate terminal computer in the first freight area, and freight and empty vehicle information unrelated to an agent affiliate is provided to agent affiliate terminal computers in all the freight areas; and
    an empty vehicle registration gas station device configured to send information about an emptiness of at least one vehicle to at least one of an agent affiliate terminal computer and the freight and empty vehicle information management server when a card reader installed in a gas station reads a membership card of an independent transport service provider who requests registration of empty vehicle information,
    wherein the freight and empty vehicle information management server is further configured to provide information about particular freight allocated to a particular vehicle only to the owner of said particular freight, an agent affiliate to which the transport of the particular freight has been entrusted, and an agent affiliate in charge of the particular vehicle which was allocated to the transport of the particular freight, so as to prevent two or more agent affiliates from allocating their vehicles to the transport of the same particular freight.

2. The system as set forth in claim 1, wherein the freight owner terminal computer is further configured to send freight information to at least one of the agent affiliate terminal computer and the freight and empty vehicle information management server, and the agent affiliate terminal computer is further configured to send freight information, received from the freight owner terminal computer, to the freight and empty vehicle information management server.

3. The system as set forth in claim 1, wherein the freight and empty vehicle information management server, when providing empty vehicle information to the agent affiliate terminal computer, provides at least one of a number of each empty vehicle and information about an agent affiliate or as transport affiliate in charge of each empty vehicle to agent affiliate terminal computers in an identical freight area and provides the number of each empty vehicle and information about a driver of each empty vehicle to agent affiliate terminal computers in different freight areas.

4. The system as set forth in claim 3, wherein the freight and empty vehicle information management server, when an empty vehicle registered in the freight and empty vehicle information management server does not belong to a specific agent affiliate, provides the number of the empty vehicle and the information about the driver of the empty vehicle to all agent affiliate terminal computers.

5. The system as set forth in claim 1, wherein the freight and empty vehicle information management server is further configured to provide a backhauling setting window to at least one agent affiliate terminal computer so as to allow backhauling to be set so that at least one vehicle that is allocated to transport freight C from area A or freight area A to area B or freight area B can transport freight E from area B or freight area B to area A for freight area A after completing the transport of freight C.

* * * * *